(12) United States Patent
Liu et al.

(10) Patent No.: US 8,866,978 B2
(45) Date of Patent: Oct. 21, 2014

(54) DISPLAY DEVICE AND TOUCH PANEL THEREOF

(75) Inventors: Liang Liu, Beijing (CN); Li Qian, Beijing (CN); Yu-Quan Wang, Beijing (CN); Chen Feng, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 707 days.

(21) Appl. No.: 12/848,224

(22) Filed: Aug. 2, 2010

(65) Prior Publication Data

US 2011/0102338 A1  May 5, 2011

(30) Foreign Application Priority Data

Nov. 2, 2009 (CN) .......................... 200910210426.9

(51) Int. Cl.
| | | |
|---|---|---|
| G02F 1/1335 | (2006.01) | |
| G06F 3/041 | (2006.01) | |
| G06F 3/044 | (2006.01) | |
| G06F 3/045 | (2006.01) | |

(52) U.S. Cl.
CPC ...... G06F 3/041 (2013.01); *G06F 2203/04103* (2013.01); G06F 3/044 (2013.01); G06F 3/045 (2013.01); *G06F 2203/04107* (2013.01)
USPC .......................................................... 349/12

(58) Field of Classification Search
USPC .......................................................... 349/12
See application file for complete search history.

(56) References Cited

U.S. PATENT DOCUMENTS

| | | | |
|---|---|---|---|
| 7,045,108 B2 | 5/2006 | Jiang et al. | |
| 2003/0020695 A1* | 1/2003 | Toda ............................ | 345/177 |
| 2007/0166223 A1 | 7/2007 | Jiang et al. | |
| 2008/0248235 A1 | 10/2008 | Feng et al. | |
| 2008/0259044 A1* | 10/2008 | Utsunomiya et al. ......... | 345/173 |
| 2008/0299031 A1 | 12/2008 | Liu et al. | |
| 2009/0153510 A1 | 6/2009 | Jiang et al. | |
| 2009/0153520 A1* | 6/2009 | Jiang et al. .................... | 345/174 |
| 2009/0153521 A1 | 6/2009 | Jiang et al. | |
| 2009/0160798 A1 | 6/2009 | Jiang et al. | |
| 2009/0160799 A1* | 6/2009 | Jiang et al. .................... | 345/173 |
| 2009/0167709 A1 | 7/2009 | Jiang et al. | |
| 2010/0149116 A1* | 6/2010 | Yang et al. .................... | 345/173 |

FOREIGN PATENT DOCUMENTS

| | | |
|---|---|---|
| CN | 101458602 A | 6/2009 |
| TW | 200928908 | 7/2009 |
| TW | 200928914 | 7/2009 |
| TW | 200929646 | 7/2009 |
| TW | 200929647 | 7/2009 |
| WO | WO2007015710 | 2/2007 |

\* cited by examiner

*Primary Examiner* — Bumsuk Won
*Assistant Examiner* — Charles Chang
(74) *Attorney, Agent, or Firm* — Novak Druce Connolly Bove + Quigg LLP

(57) ABSTRACT

A display device includes a display element and a touch panel including a first electrode plate and a second electrode plate. The first electrode plate includes a first conductive layer and two first electrodes electrically connected to the first conductive layer. The second electrode plate includes a second conductive layer and two second electrodes electrically connected to the second conductive layer. The display element includes a plurality of pixels arranged in rows and columns along a first direction and a second direction. At least one of the first conductive layer and the second conductive layer includes a plurality of carbon nanotubes arranged primarily along the same aligned direction. The aligned direction and the second direction define an angle ranging from above 0° to less than or equal to 90°.

20 Claims, 7 Drawing Sheets

DISPLAY DEVICE AND TOUCH PANEL THEREOF

CROSS-REFERENCE TO RELATED APPLICATIONS

This application claims all benefits accruing under 35 U.S.C. §119 from China Patent Application No. 200910210426.9, filed on Nov. 2, 2009, in the China Intellectual Property Office, the disclosure of which is incorporated herein by reference.

BACKGROUND

1. Technical Field

The disclosure relates to touch panels and, particularly, to a carbon nanotube-based touch panel and a display device incorporating the same.

2. Description of Related Art

Following the advancement in recent years of various electronic apparatuses such as mobile phones, car navigation systems and the like toward high performance and diversification, there is continuous growth in the number of electronic apparatuses equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation.

At present, resistive, capacitive, infrared, and surface acoustic wave touch panels have been developed. Due to higher accuracy and low cost of production, resistive and capacitive touch panels have been most widely applied.

A resistive or capacitive touch panel often includes a layer of indium tin oxide (ITO) used as an optically transparent conductive layer. The ITO layer is generally formed by ion beam sputtering, a relatively complicated undertaking Furthermore, the ITO layer has poor wearability, low chemical endurance and uneven resistance over the entire area of the panel, as well as relatively low transparency. Such characteristics of the ITO layer can significantly impair sensitivity, accuracy, and brightness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
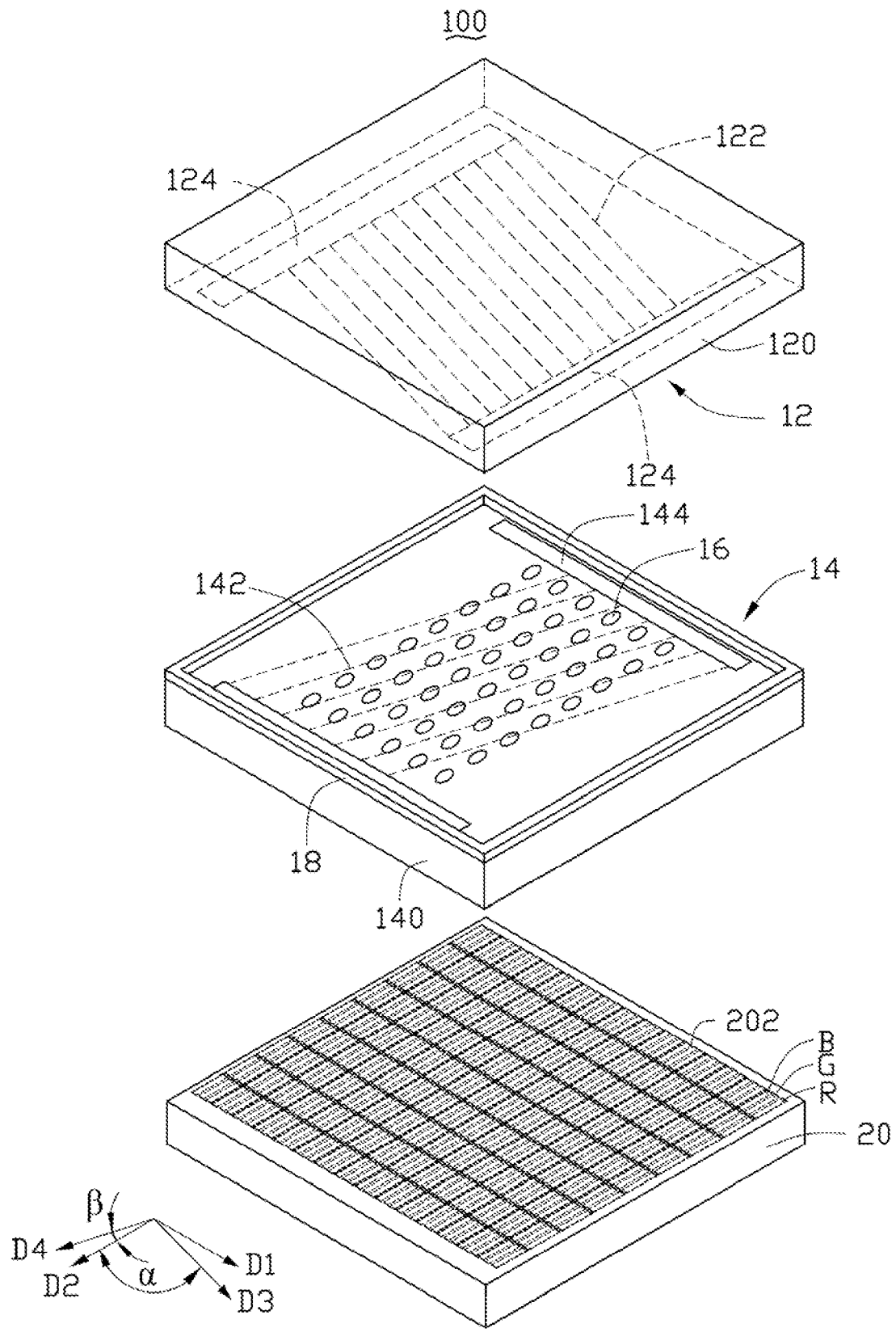
FIG. 1 is an exploded, isometric view of an embodiment of a display device.
Figure 2:
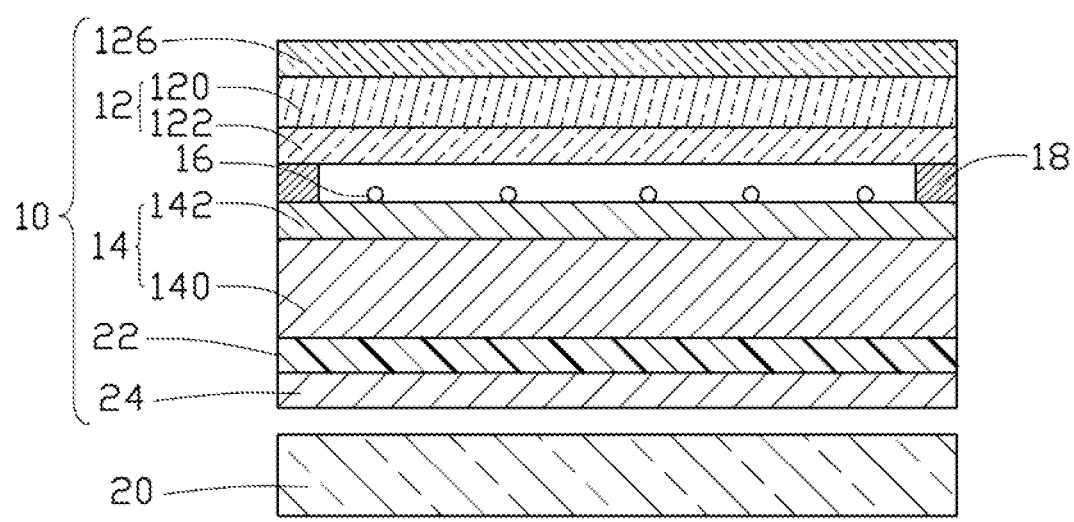
FIG. 2 is a transverse cross-section of the assembled display device of FIG. 1.

Referring to FIG. 1 and FIG. 2, one embodiment of a display device 100 comprises a touch panel 10 and a display element 20. The touch panel 10 can be a resistive touch panel. The touch panel 10 is opposite and adjacent to the display element 20. In detail, the touch panel 10 can be spaced from the display element 20 or installed directly on the display element 20. If the touch panel 10 is installed directly on the display element 20, the touch panel 10 can be attached on the display element 20 via adhesive.

The display element 20 can be, for example, a conventional display such as a liquid crystal display, field emission display, plasma display, electroluminescent display, vacuum fluorescent display, cathode ray tube, or other display device, or a flexible display such as an e-paper (i.e., a microencapsulated electrophoretic display), a flexible liquid crystal display, a flexible organic light emitting display (OLED), or any other flexible display. In one embodiment, the display element 20 can be a liquid crystal display.

The display element 20 comprises an array of pixels 202 arranged in rows and columns along a first direction and a second direction. The first direction is parallel to the D1 axis shown in FIG. 1. The second direction is parallel to the D2 axis shown in FIG. 1. The first direction is perpendicular to the second direction. Each of the pixels 202 comprises three sub-pixels for red, green and blue light (for example, R sub-pixel, G sub-pixel, B sub-pixel) corresponding to three display units. The R, B, G sub-pixels are regularly arranged along the first direction.

The touch panel 10 comprises a first electrode plate 12, a second electrode plate 14, and a plurality of dot spacers 16 disposed between the first electrode plate 12 and the second electrode plate 14.

The first electrode plate 12 includes a first substrate 120, a first conductive layer 122, and two first electrodes 124. The first substrate 120 is substantially flat. The first conductive layer 122 and the two first electrodes 124 are located on a surface of the first substrate 120. The two first electrodes 124 are located separately on opposite ends of the first conductive layer 122 along the first direction. The two first electrodes 124 electrically connect to the first conductive layer 122.

The second electrode plate 14 includes a second substrate 140, a second conductive layer 142, and two second electrodes 144. The second substrate 140 is substantially flat. The second conductive layer 142 and the two second electrodes 144 are located on a surface of the second substrate 140. The two second electrodes 144 are located separately on opposite ends of the second conductive layer 142 along the second direction. The two second electrodes 144 electrically connect to the second conductive layer 142. The second conductive layer 142 and the two second electrodes 144 are opposite to and spaced from the first conductive layer 122 and the two first electrodes 124. The two second electrodes 144 are orthogonal to the two first electrodes 124.

The first substrate 120 is a transparent and flexible film/plate made of polymer, resin, or any other flexible material. The second substrate 140 is a transparent board made of glass, diamond, quartz, plastic or any other suitable material. The second substrate 140 can be made of flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins.

The first electrodes 124 and the second electrodes 144 can be made of electrically conductive materials, such as metal or carbon nanotubes. The first electrodes 124 and the second electrodes 144 can be directly formed on the first conductive layer 122 and the second conductive layer 142, respectively, via sputtering, electroplating, or chemical plating. Alternatively, the first electrodes 124 and the second electrodes 144 can be adhered to the first conductive layer 122 and the second conductive layer 142, respectively, via conductive adhesives. It is noted that the first electrodes 124 can be disposed between the first substrate 120 and the first conductive layer 122, or be disposed on the first substrate 120. In one embodiment, the first substrate 120 is a polyester film, the second substrate 140 is a glass board, and the first electrode 124 and the second electrode 144 are made of silver.

At least one of the first conductive layer 122 and the second conductive layer 142 can be or can include a carbon nanotube structure formed of a plurality of carbon nanotubes. In one embodiment, the carbon nanotube structure can comprise at least one carbon nanotube film. The carbon nanotube film can be a drawn carbon nanotube film.

Examples of a drawn carbon nanotube film are taught by U.S. Pat. No. 7,045,108 to Jiang et al., and WO 2007015710 to Zhang et al. The drawn carbon nanotube film includes a plurality of successive and oriented carbon nanotubes joined end-to-end by Van der Waals force. The carbon nanotubes in the carbon nanotube film can be substantially aligned along a single axis. The drawn carbon nanotube film can be formed by drawing a film from a carbon nanotube array that is capable of having a film drawn therefrom.

Figure 3:
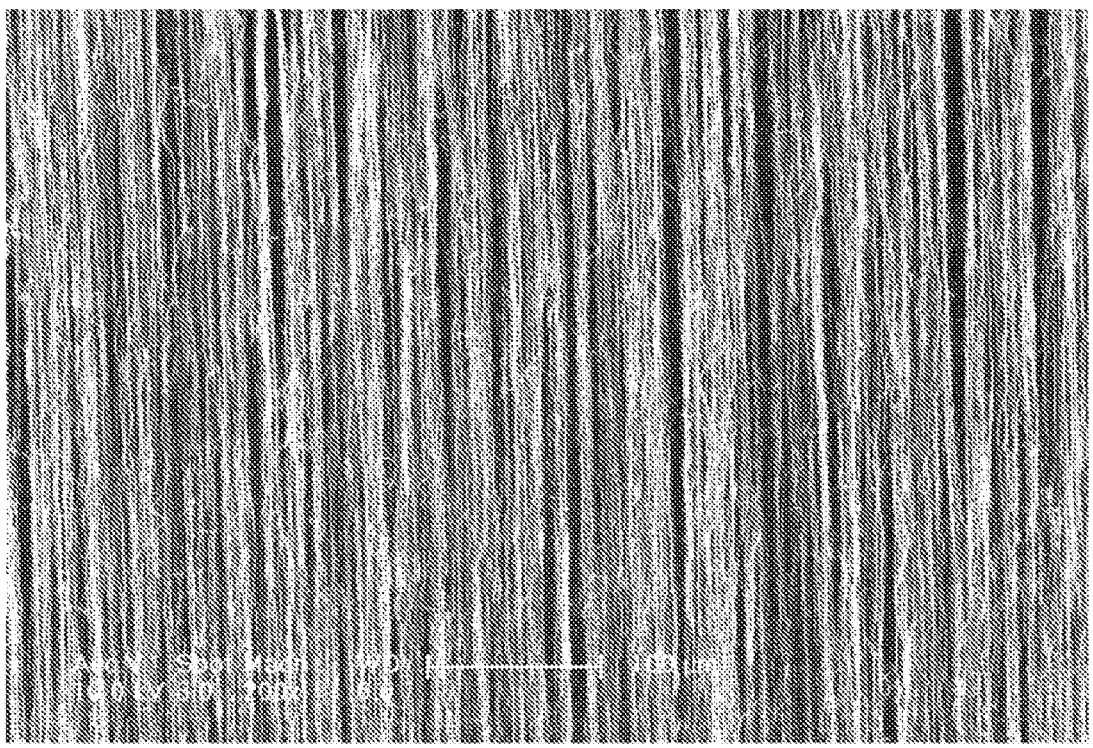
FIG. 3 shows a Scanning Electron Microscope (SEM) image of a carbon nanotube film.
Figure 4:
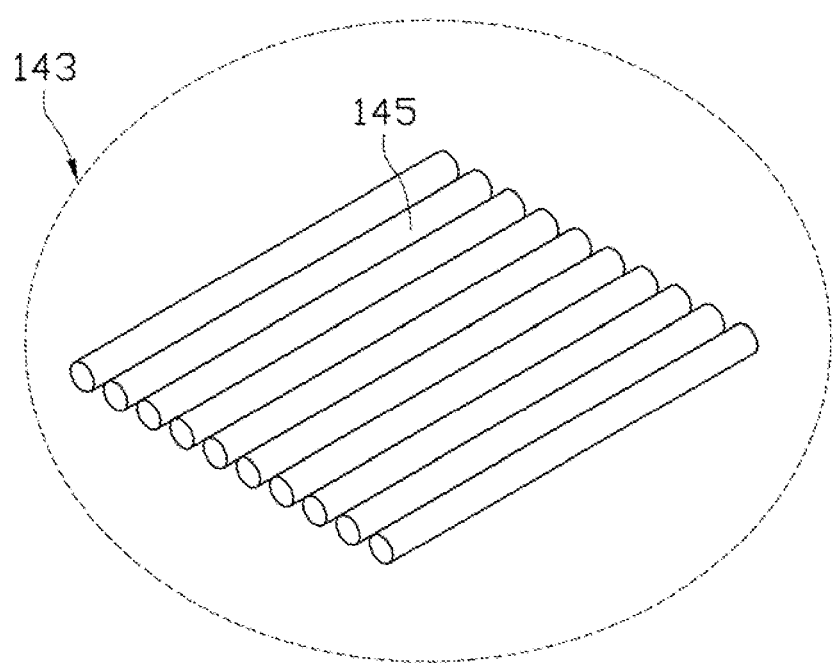
FIG. 4 is a schematic, enlarged view of a carbon nanotube segment.

Referring to FIGS. 3 and 4, each drawn carbon nanotube film includes a plurality of successively oriented carbon nanotube segments 143 joined end-to-end by Van der Waals force. Each carbon nanotube segment 143 includes a plurality of carbon nanotubes 145 parallel to each other, and combined by Van der Waals force. As can be seen in FIG. 3, some variations can occur in the drawn carbon nanotube film.

The drawn carbon nanotube film can be a freestanding structure. The term "freestanding" includes, but is not limited to, a structure that does not have to be supported by a substrate and can sustain its weight when hoisted by a portion thereof without any significant damage to its structural integrity. The thickness of the drawn carbon nanotube film can range from about 0.5 nm to about 100 μm.

Further, in one embodiment, the carbon nanotube structure can comprise at least two stacked carbon nanotube films or a plurality of carbon nanotube films, stacked or not, contiguously disposed side by side. The number of carbon nanotube films is not limited, so long as the carbon nanotube structure has a proper light transmittance according to the actual needs. The light transmittance of the drawn carbon nanotube film can range from about 70%-80%. The light transmittance of the drawn carbon nanotube film can be improved to about 95% via laser treatment.

If the carbon nanotube structure comprises a plurality of stacked drawn carbon nanotube films, an angle can exist between the aligned directions of carbon nanotubes in adjacent drawn carbon nanotube films. The angle between the aligned directions of the carbon nanotubes in the adjacent drawn carbon nanotube films can range from 0° to about 90°.

In one embodiment, the first conductive layer 122 and the second conductive layer 142 both include a carbon nanotube structure formed by a single drawn carbon nanotube film. The carbon nanotube films of the first electrode plate 12 and the second electrode plate 14 each have a length of about 30 cm, a width of about 15 cm and a thickness of about 50 nm. The light transmittance of the carbon nanotube films can be greater than 95%.

An angle between aligned directions of carbon nanotubes in the drawn carbon nanotube films of the first electrode plate 12 and the second electrode plate 14 can range from 0° to about 90°. As shown in FIG. 1, the aligned direction of the carbon nanotubes in the drawn carbon nanotube film of the first electrode plate 12 is represented by D3 axis, and the aligned direction of the carbon nanotubes in the drawn carbon nanotube film of the second electrode plate 14 is represented by D4 axis. The D3 axis can be perpendicular to the D4 axis. An angle α is defined between the D3 axis and the D2 axis. An angle β is defined between the D4 axis and the D2 axis. Each of the angles α, β can be greater than 0° and less than or equal to 90°. For example, the angles α, β can be about 45°. In one embodiment, the angle α can be about 80°, and the angle β can be about 10°.

By the presence of the angles α, β, undesirable irregular images can be eliminated or reduced if the touch panel 10 is disposed on the display element 20 so that the resolution and the display quality of the display device 100 can be greatly improved. If the aligned directions of the carbon nanotubes in the carbon nanotube films of the first electrode plate 12 and the second electrode plate 14 are parallel to the D2 axis (for example the angles α, β are 0°), light from the display element 20 tends to be blocked by the carbon nanotubes of the carbon nanotube films. This will affect the resolution and the display quality.

If one of the first conductive layer 122 and the second conductive layer 142 is a drawn carbon nanotube film, the other can be an indium tin oxides (ITO) layer or an antimony tin oxide (ATO) layer. In this situation, the aligned direction of the carbon nanotubes in the drawn carbon nanotube film and the D2 axis together define the angle α or β which can be greater than 0° to less than or equal to 90°. In some embodiments, the angle α or β can be greater than 10° to less than 80°.

If the first conductive layer 122 or the second conductive layer 142 comprises a plurality of stacked drawn carbon nanotube films, aligned directions of carbon nanotubes in the drawn carbon nanotube films of the first conductive layer 122 or the second conductive layer 142 can be the same or different.

If the aligned directions of carbon nanotubes in the stacked drawn carbon nanotube films of the first conductive layer 122 or the second conductive layer 142 are the same, the aligned direction of the carbon nanotubes in the stacked drawn carbon nanotube films and the D2 axis together define an angle α or β which can be greater than 0° to less than or equal to 90°.

If the aligned directions of carbon nanotubes in the stacked drawn carbon nanotube films of the first conductive layer 122 or the second conductive layer 142 are different, an aligned direction of carbon nanotubes in each of the stacked drawn carbon nanotube films and the D2 axis together define an angle α or β which can be greater than 0° to less than or equal to 90°.

Further, the touch panel 10 can comprise an insulating layer 18 disposed on the second electrode plate 14. The first electrode plate 12 is disposed on the insulating layer 18. The insulating layer 18 separates the first electrode plate 12 from the second electrode plate 14. A distance between the second electrode plate 14 and the first electrode plate 12 can be in an approximate range from about 2 to about 20 microns.

The dot spacers 16 and the insulating layer 18 are disposed between the first electrode plate 12 and the second electrode plate 14. The dot spacers 16 are separately located on the second conductive layer 142. The insulating layer 18 and the dot spacers 16 can be made of, for example, insulating resin or any other suitable insulating material. Insulation between the first electrode plate 12 and the second electrode plate 14 is provided by the insulating layer 18 and the dot spacers 16. It is to be understood that the dot spacers 16 are optional, particularly when the touch panel 10 is relatively small. They serve as supports given the size of the span and the strength of the first electrode plate 12.

The touch panel 10 can further comprise a transparent protective film 126 disposed on a surface of the first electrode plate 12. The material of the transparent protective film 126 can be silicon nitride, silicon dioxide, BCB, polyester, acrylic resin, PET, or any combination thereof. The transparent protective film 126 can also be a plastic film with surface hardening treatment in use. The transparent protective film 126 can also provide some additional functions, such as reducing glare, reflection etc. In the present embodiment, the material of the transparent protective film 126 is PET.

The touch panel 10 can further comprise a shielding layer 22 disposed on a surface of the second substrate 140. The shielding layer 22 and the second conductive layer 142 are disposed on opposite surfaces of the second electrode plate 14. The material of the shielding layer 22 can be ITO film, ATO film, conductive resin film, carbon nanotube film, or another suitable conductive film. In one embodiment, the shielding layer 22 is a carbon nanotube film. The carbon nanotube film includes a plurality of carbon nanotubes, orientations of the carbon nanotubes therein can be arbitrarily determined. In one embodiment, the carbon nanotubes in the carbon nanotube film of the shielding layer 22 are arranged along the same axis. The carbon nanotube film is connected to ground and acts as shielding, thus enabling the touch panel 10 to operate without interference (for example, electromagnetic interference).

The touch panel 10 can further comprise a passivation layer 24 disposed on a surface of the shielding layer 22 separated from the second substrate 140. The passivation layer 24 can be spaced from the display element 20 a certain distance 26 or can be installed directly on the display element 20. The passivation layer 24 can protect the display element 20 from chemical or mechanical damage.

Figure 5:
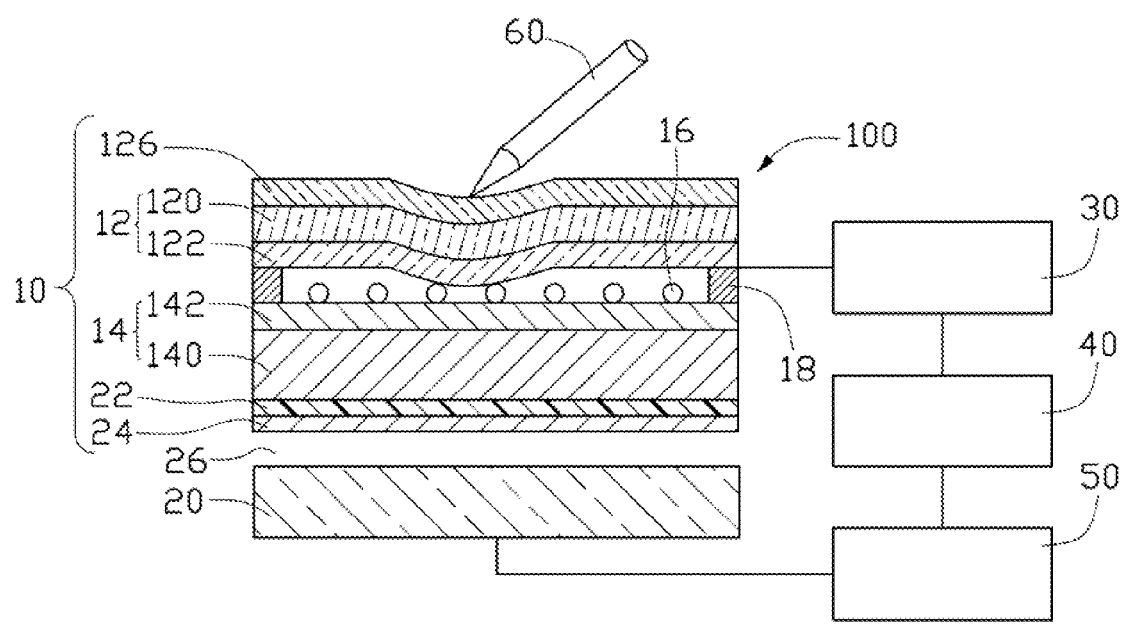
FIG. 5 shows an operating stage of the display device of FIG. 1 with a contact tool.

Referring to FIG. 5, the display device 100 can further comprise a touch panel controller 30, a central processing unit (CPU) 40, and a display element controller 50. The touch panel 10 is connected to the touch panel controller 30 by a circuit external to the touch panel 10. The touch panel controller 30, the CPU 40 and the display element controller 50 are electrically connected. In particular, the CPU 40 is connected to the display element controller 50 to control the display element 20.

In operation of the display device 100, a voltage of about 5V is applied to the first electrode plate 12 and the second electrode plate 14, respectively. Contact is made with the first electrode plate 12 corresponding to elements appearing on the display element 20 by a tool 60 such as a finger, pen, or the like. The resulting deformation of the first electrode plate 12 causes a connection between the first conductive layer 122 and the second conduction layer 142. Changes in voltages in the D2 axis of the first conductive layer 122 and the D3 axis of the second conductive layer 142 are detected by the touch panel controller 30 and sent to the CPU 40 to calculate position of the deformation. The display element 20 shows desired information under control of the display element controller 50 and the CPU 40.

Figure 6:
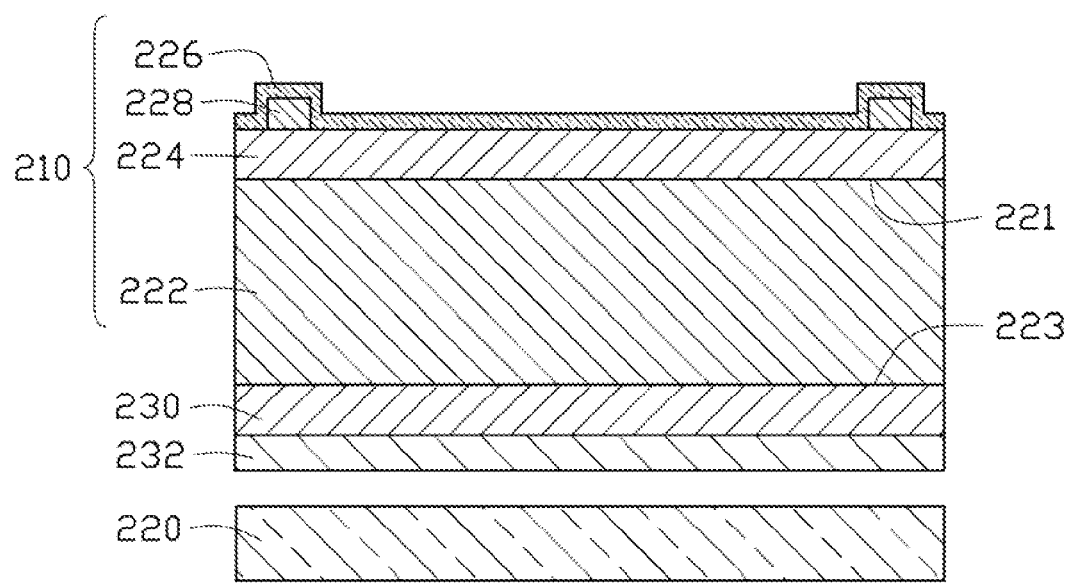
FIG. 6 is a schematic cross-section of another embodiment of a display device.

Referring to FIG. 6, one embodiment of a display device 200 is provided. The display device 200 comprises a touch panel 210 and a display element 220. The touch panel 210 is capacitive. The touch panel 210 is opposite and adjacent to the display element 220. The touch panel 210 can be spaced from the display element 220 or installed directly on the display element 220. The display element 220 can be the same as the display element 20.

The touch panel 210 comprises a substrate 222, a transparent conductive layer 224, at least two electrodes 228 and a transparent protective film 226. The substrate 222 comprises a first surface 221 and an opposite second surface 223. The transparent conductive layer 224 is disposed on the first surface 221. The first surface 221 is separated from the display element 220, unlike second surface 223.

The at least two electrodes 228 are spaced disposed and electrically connected to the transparent conductive layer 224 to form an equipotential plane thereon. The transparent protective film 226 can be directly disposed on the transparent conductive layer 224, the at least two first electrodes 228.

In one embodiment, four electrodes 228 are disposed at corners or sides of the transparent conductive layer 224. As a result, an even resistance network can be formed. In one embodiment, four longitudinal electrodes 228 disposed at four sides of one surface of the transparent conductive layer 224. The four longitudinal electrodes 228 are disposed on the transparent conductive layer 224 separated from the substrate 222. It is noted that the four electrodes 228 can be disposed between the substrate 222 and the transparent conductive layer 224.

The substrate 222 can be a curved structure or a planar structure. The substrate 222 can be made of rigid materials such as glass, quartz, diamond or plastic. The substrate 222 can also be made of flexible materials the same as that of the first substrate 120.

The transparent conductive layer 224 is a carbon nanotube structure formed of a plurality of carbon nanotubes. In one embodiment, the carbon nanotube structure can comprise at least one carbon nanotube film. The carbon nanotube film can be a drawn carbon nanotube film. If the carbon nanotube structure comprises two or more layers of stacked drawn carbon nanotube films, aligned directions of carbon nanotubes in the drawn carbon nanotube films can be the same or different.

If the aligned directions of carbon nanotubes in the stacked drawn carbon nanotube films are the same, the D2 axis and the aligned direction of the carbon nanotubes in the stacked drawn carbon nanotube films together define an angle α or β which can be greater than 0° to less than or equal to 90°.

If the aligned directions of carbon nanotube films are different, an aligned direction of carbon nanotubes in each of the stacked drawn carbon nanotube films and the D2 axis together define the angle α or β which can be greater 0° to less than or equal to 90°.

In one embodiment, the carbon nanotube structure comprises two layers of drawn carbon nanotube films, wherein aligned directions of carbon nanotubes in the two stacked drawn carbon nanotube films are different. An aligned direction of carbon nanotubes in each of the stacked drawn carbon nanotube film and the D2 axis together define the angle α or β of about 45°.

The four electrodes 228 can be made of electrically conductive materials such as metal or carbon nanotubes. In one embodiment, the electrodes 228 are a strip of silver or copper layer.

The transparent protective film 226 protects the transparent conductive layer 224 from damage. The material of the transparent protective film 226 can be silicon nitride, silicon dioxide, BCB, polyester, acrylic resin, PET, or any combination thereof. The transparent protective film 226 can also be a plastic film that receives a surface hardening treatment. The transparent protective film 226 can also provide additional functions such as reducing glare, reflection.

The touch panel 210 can further comprise a shielding layer 230 disposed on the second surface 223 of the substrate 222. The material of the shielding layer 230 can be ITO film, ATO film, conductive resin film, carbon nanotube film, or another suitable conductive film. In one embodiment, the shielding layer 230 is a carbon nanotube film. The carbon nanotube film includes a plurality of carbon nanotubes, and the orientations of the carbon nanotubes therein can be arbitrarily determined. In one embodiment, the carbon nanotubes in the carbon nanotube film of the shielding layer 230 are arranged along the same axis. The carbon nanotube film is connected to ground and acts as shielding, thus enabling the touch panel 210 to operate without interference (for example, electromagnetic interference).

The touch panel 210 can further comprise a passivation layer 232 disposed on a surface of the shielding layer 230. The passivation layer 232 is adjacent the display element 220.

Figure 7:
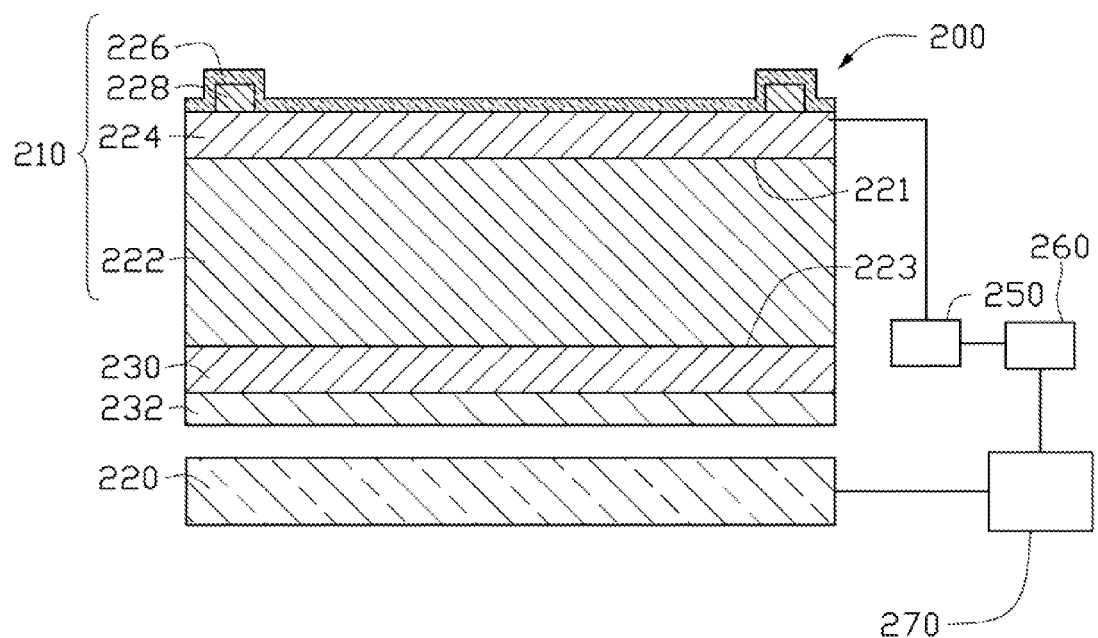
FIG. 7 shows an operating stage of the display device of FIG. 6.

Referring to FIG. 7, in operation of the display device 200, a voltage of about 5V is applied to the transparent conductive layer 224 through the electrodes 228 to form an equipotential plane on the transparent conductive layer 224. Contact is made with the transparent protective film 226 of the touch panel 210 corresponding to elements appearing on the display device 200 from a contact tool (not shown), such as a finger or stylus.

Due to an electrical field of the user, a coupling capacitance forms between the user and the transparent conductive layer 224. For high frequency electrical current, the coupling capacitance is a conductor, and thus the contact tool takes away a little current from the contact point. Current through the electrodes 228 cooperatively replaces the current lost at the contact point. The quantity of current supplied by each electrode 228 is directly proportional to the distance to the contact point. The touch panel controller 250 calculates the proportion of the four supplied currents, thereby detecting coordinates of the contact point on the touch panel 210. Then, the touch panel controller 250 sends the coordinates of the contact point to the CPU 260. The CPU 260 receives and processes the coordinates into a command. Finally, the CPU 260 issues the command to the display element controller 270. The display element controller 270 controls the display of the display element 220 accordingly.

According to the above descriptions, the touch panel and the display device of present disclosure has following advantages. (1) Because the carbon nanotube film has a high transparency, the brightness of the touch panel and the display device using the same will be improved. (2) The properties of the carbon nanotubes provide superior toughness, high mechanical strength, and uniform conductivity to the carbon nanotube film. Thus, the touch panel and the display device using the same adopting the carbon nanotube film are durable and highly conductive. (3) Disposition of the angles α and β eliminates or reduces the presence of undesirable irregular images if the touch panel is disposed on the display element, and resolution and display quality are, accordingly, greatly improved.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A display device comprising:
    a touch panel comprising:
        a first electrode plate comprising a first conductive layer and two spaced first electrodes electrically connected to the first conductive layer; and
        a second electrode plate spaced from the first electrode plate, the second electrode plate comprises a second conductive layer opposite to the first conductive layer and two second electrodes electrically connected to the second conductive layer; and
    a display element adjacent to the second electrode plate, the display element comprising a plurality of pixels arranged in rows and columns along a first direction and a second direction;
    wherein at least one of the first conductive layer and the second conductive layer comprises a carbon nanotube structure consisting of a plurality of carbon nanotubes arranged along a third direction, wherein an angle is defined between the third direction and the second direction, and the angle ranges from above 0° to less than 90°.

2. The display device of claim 1, wherein each of the plurality of pixels comprises a red sub-pixel, a green sub-pixel, and a blue sub-pixel, and the red sub-pixel, the green sub-pixel and the blue sub-pixel are regularly arranged along the first direction.

3. The display device of claim 1, wherein the angle ranges from above 10° to less than 80°.

4. The display device of claim 1, wherein the angle is about 45°.

5. The display device of claim 1, wherein the carbon nanotube structure comprises at least one carbon nanotube film, the at least one carbon nanotube film comprises a plurality of successive and oriented carbon nanotubes joined end-to-end by Van der Waals force.

6. The display device of claim 5, wherein the carbon nanotube structure comprises a plurality of carbon nanotube films contiguously disposed side by side.

7. The display device of claim 5, wherein the carbon nanotube structure comprises a plurality of stacked carbon nanotube films.

8. The display device of claim 5, wherein the at least one carbon nanotube film has a thickness ranging from about 0.5 nm to about 100 μm.

9. The display device of claim 1, wherein the first electrodes are located on opposite ends of the first conductive layer along the first direction, and the second electrodes are located on opposite ends of the second conductive layer along the second direction.

10. The display device of claim 1, wherein the first electrode plate further comprises a first substrate, and the first conductive layer is disposed on the first substrate; and the second electrode plate further comprises a second substrate and the second conductive layer is disposed on the second substrate.

11. A display device comprising:
a touch panel comprising an electrode plate comprising a conductive layer and at least two spaced electrodes electrically connected to the conductive layer; and
a display element adjacent to the touch panel, the display element comprising a plurality of pixels arranged in rows and columns along a first direction and a second direction;
wherein the conductive layer consists of a plurality of first carbon nanotubes arranged along a third direction, wherein an angle is defined between the third direction and the second direction, and the angle ranges from greater than 0° to less than 90°.

12. The display device of claim 11, wherein the plurality of first carbon nanotubes are drawn to form a carbon nanotube film so that the plurality of first carbon nanotubes are joined end to end by Van der Waals force, and the conductive layer comprises the drawn carbon nanotube film.

13. The display device of claim 11, wherein the touch panel further comprises an opposite electrode plate spaced from the electrode plate; the opposite electrode plate comprises a conductive layer and at least two electrodes electrically connected to the conductive layer of the opposite electrode plate; and the conductive layer of the opposite electrode plate is opposite to the conductive layer of the electrode plate.

14. The display device of claim 13, wherein the conductive layer of the opposite electrode plate is an indium tin oxides (ITO) layer or an antimony tin oxide (ATO) layer.

15. The display device of claim 13, wherein the conductive layer of the opposite electrode plate comprises a plurality of second carbon nanotubes arranged primarily along a fourth direction.

16. The display device of claim 15, wherein the third direction is perpendicular to the fourth direction.

17. The display device of claim 15, wherein the fourth direction and the second direction define an angle ranging from greater than 0° to less than or equal to 90°.

18. A display device comprising:
a touch panel comprising:
a first electrode plate comprising a first conductive layer and two first electrodes, each of the two first electrode being electrically connected to the first conductive layer and spaced from each other; and
a second electrode plate spaced from the first electrode plate, the second electrode plate comprises a second conductive layer opposite to the first conductive layer and two second electrodes each electrically connected to the second conductive layer; and
a display element adjacent to the second electrode plate, the display element comprising a plurality of pixels arranged in rows and columns along a first direction and a second direction perpendicular with the first direction;
wherein the first conductive layer is a first carbon nanotube film consisting of a plurality of first carbon nanotubes arranged along a third direction; the second conductive layer is a second carbon nanotube film consisting of a plurality of second carbon nanotubes arranged along a fourth direction, the fourth direction intersects with the third direction, a first angle is defined between the third direction and the first direction, and the first angle is greater than 0° and less than 90°; a second angle is defined between the fourth direction and the first direction, and the second angle is greater than 0° and less than 90°.

19. The display device of claim 18, wherein the first angle is greater than 10° and less than 80°.

20. The display device of claim 18, wherein the second angle is greater than 10° and less than 80°.

\* \* \* \* \*